US009577428B2

(12) United States Patent
Grebel et al.

(10) Patent No.: US 9,577,428 B2
(45) Date of Patent: Feb. 21, 2017

(54) PACKETED ENERGY DELIVERY SYSTEM AND METHODS

(71) Applicants: Haim Grebel, Livingston, NJ (US); Roberto Rojas-Cessa, Brooklyn, NY (US)

(72) Inventors: Haim Grebel, Livingston, NJ (US); Roberto Rojas-Cessa, Brooklyn, NY (US)

(73) Assignee: New Jersey Institute of Technology, Newark, NJ (US)

( * ) Notice: Subject to any disclaimer, the term of this patent is extended or adjusted under 35 U.S.C. 154(b) by 654 days.

(21) Appl. No.: 14/084,208

(22) Filed: Nov. 19, 2013

(65) Prior Publication Data

US 2015/0142198 A1 May 21, 2015

(51) Int. Cl.
*G06F 19/00* (2011.01)
*H02J 3/00* (2006.01)
*H02J 3/38* (2006.01)

(52) U.S. Cl.
CPC .............. *H02J 3/008* (2013.01); *H02J 3/005* (2013.01); *H02J 3/381* (2013.01); *Y04S 50/10* (2013.01)

(58) Field of Classification Search
CPC .. H02J 3/005; H02J 3/381; H02J 3/008; H02J 13/0013; Y04S 50/10; G05B 15/02
USPC ........................................................ 700/295
See application file for complete search history.

(56) References Cited

U.S. PATENT DOCUMENTS

| | | | | |
|---|---|---|---|---|
| 8,607,078 B2* | 12/2013 | Tajima | ..................... | G06F 1/266 700/286 |
| 2006/0029178 A1* | 2/2006 | Tahan | ..................... | G21B 3/00 376/100 |
| 2011/0233997 A1* | 9/2011 | Tajima | ................... | G06F 1/3203 307/9.1 |
| 2013/0138256 A1* | 5/2013 | Sako | ........................ | H02J 3/14 700/286 |
| 2015/0142198 A1* | 5/2015 | Grebel | ..................... | H02J 3/005 700/295 |
| 2015/0263519 A1* | 9/2015 | Suzuki | ..................... | H02J 3/005 700/297 |
| 2015/0311711 A1* | 10/2015 | Okabe | ...................... | H02J 3/00 700/298 |

(Continued)

OTHER PUBLICATIONS

Tashiro, Keiji, Ryo Takahashi, and Takashi Hikihara. "Feasibility of power packet dispatching at in-home DC distribution network." Smart Grid Communications (SmartGridComm), 2012 IEEE Third International Conference on. IEEE, 2012.*

(Continued)

*Primary Examiner* — Michael D Masinick
(74) *Attorney, Agent, or Firm* — Timothy X. Gibson, Esq.; Gibson & Dernier LLP

(57) ABSTRACT

Methods and apparatus for packetized energy distribution are provided. A data and power delivery network, called a digital grid, is provided to facilitate delivery of power upon request. Energy bits (quanta) serve as a means to deliver energy as well as coding. Voltage pulses of varying time scales are used for coding and current levels help to accurately meet customer's demand. Energy is sent as packets (a combination of energy bits), and specific energy packets are addressed to specific customers permitting accurate monitoring and distribution of electrical energy.

16 Claims, 11 Drawing Sheets

(56) References Cited

U.S. PATENT DOCUMENTS

| | | | | | |
|---|---|---|---|---|---|
| 2015/0357909 | A1* | 12/2015 | Kobayashi | ............ | H02M 7/493 363/126 |
| 2015/0372487 | A1* | 12/2015 | Abe | ........................ | H02J 3/40 700/295 |

OTHER PUBLICATIONS

Bryant et al, "Making the Smart Energy Grid Even Smarter", Computing Community Consortium, Version 15: Jul. 20, 2010.*

"LoCal: Rethinking the Energy Infrastructure using Internet Design Principles", David Culler, UC Berkley, Renewable Energy Microgrid Research Workshop, Jun. 5, 2009.*

Xu, Yifei, Roberto Rojas-Cessa, and Haim Grebel. "Allocation of discrete energy on a cloud-computing datacenter using a digital power grid." Green Computing and Communications (GreenCom), 2012 IEEE International Conference on. IEEE, 2012.*

R. Abe, H. Taoka, and D. McQuilkin. Digital grid: Communicative electrical grids of the future. Smart Grid, IEEE Transactions on, 2(2):399-410, Jun. 2011.

W. Bingbing, Y. Zhongdong, and X. Xiangning. Super-capacitors energy storage system applied in the microgrid. In Industrial Electronics and Applications (ICIEA), 2010 the 5th IEEE Conference, pp. 1002-1005, Jun. 2010.

S. Bossart and J. Bean. Metrics and benets analysis and challenges for smart grid field projects. In Energytech, 2011 IEEE, pp. 1-5, May 2011.

F. Bouhafs, M. Mackay, and M. Merabti. Links to the future: Communication requirements and challenges in the smart grid. Power and Energy Magazine, IEEE, 10(1):24-32, Jan.-Feb. 2012.

K. Budka, J. Deshpande, J. Hobby, Y.-J. Kim, V. Kolesnikov, W. Lee, T. Reddington, M. Thottan, C. White, J.-I. Choi, J. Hong, J. Kim, W. Ko, Y.-W. Nam, and S.-Y. Sohn. Geri—Bell Labs smart grid research focus: Economic modeling, networking, and security amp; privacy. Smart Grid Communications (SmartGridComm), 2010 First IEEE International Conference, pp. 208-213, Oct. 2010.

A. Costabeber, P. Tenti, and P. Mattavelli. Surround control of distributed energy resources in micro-grids. In Sustainable Energy Technologies (ICSET), 2010 IEEE International Conference, pp. 1-6, Dec. 2010.

Z. Fan, P. Kulkarni, S. Gormus, C. Efthymiou, G. Kalogridis, M. Sooriyabandara, Z. Zhu, S. Lambotharan, and W. Chin. Smart grid communications: Overview of research challenges, solutions, and standardization activities. Communications Surveys Tutorials, IEEE, pp. (99):1-18, 2012.

S. Galli, A. Scaglione, and Z. Wang. For the grid and through the grid: The role of power line communications in the smart grid. Proceedings of the IEEE, 99(6):998-1027, Jun. 2011.

R. Gono, S. Rusek, and M. Kratky. Reliability analysis of distribution networks. In Electrical Power Quality and Utilisation, 2007. EPQU 2007. 9th International Conference, pp. 1-5, Oct. 2007.

H. He. Toward a smart grid: Integration of computational intelligence into power grid. In Neural Networks (IJCNN), The 2010 International Joint Conference, pp. 1-6, Jul. 2010.

F. Lei, G. Ruifeng, Z. Wanrong, and Y. Xiaoping. Type and characteristic analysis of fault current limiter. In Electric Power Equipment—Switching Technology (ICEPE-ST), 2011 1st International Conference on, pp. 356-361, Oct. 2011.

W.-H. Liu, K. Liu, and D. Pearson. Consumer-centric smart grid. Innovative Smart Grid Technologies (ISGT), 2011 IEEE PES, pp. 1-6, Jan. 2011.

G. Lu, D. De, and W.-Z. Song. Smartgridlab: A laboratory-based smart grid testbed. Smart Grid Communications (SmartGridComm), 2010 First IEEE International Conference, pp. 143-148, Oct. 2010.

S. Pahwa, A. Hodges, C. Scoglio, and S. Wood. Topological analysis of the power grid and mitigation strategies against cascading failures. Systems Conference, 2010 4th Annual IEEE, pp. 272-276, Apr. 2010.

R. Rojas-Cessa, Z. Dong, and C.-B. Lin. Coexistence of streaming and packetized data throughout the protocol stack. Sarnoff Symposium, 2009. SARNOFF '09. IEEE, pp. 1-5, Apr. 1, 2009.

H. Slootweg. Smart grids—the future or fantasy? Smart Metering—Making it Happen, 2009 IET, pp. 1-19, Feb. 2009.

T. Takuno, M. Koyama, and T. Hikihara. In-home power distribution systems by circuit switching and power packet dispatching. Smart Grid Communications (SmartGridComm), 2010 First IEEE International Conference, pp. 427-430, Oct. 2010.

W.-Y. Yu, V.-W. Soo, M.-S. Tsai, and Y.-B. Peng. Coordinating a society of switch agents for power distribution service restoration in a smart grid. Intelligent System Application to Power Systems (ISAP), 2011 16th International Conference, pp. 1-7, Sep. 2011.

T. Takuno, Y. Kitamori, R. Takahashi, and T. Hikihara, AC power routing system in home based on demand and supply utilizing distributed power sources, Energies, vol. 4, No. 5, pp. 717-726, Jun. 2011.

M. M. He, E. M. Reutzel, X. Jiang, R. H. Katz, S. R. Sanders, D. E. Culler, and K. Lutz, An architecture for local energy generation, distribution, and sharing, IEEE Energy2030, Nov. 2008, pp. 1-6. [22].

M. Marcu and D. Tudor, "Power consumption measurements of virtual machines," Applied Computational Intelligence and Informatics (SACI), 2011 6th IEEE International Symposium, May 2011, pp. 445-449.

A. Beloglazov and R. Buyya, "Energy efficient resource management in virtualized cloud data centers," in Cluster, Cloud and Grid Computing (CCGrid), 2010 10th IEEE/ACM International Conference, May 2010, pp. 826-831.

J. F. Brady, Virtualization and cpu wait times in a linux guest environment, J. Comp. Resource Mgmt, vol. 116, 2005.

Y. Wang and X. Wang, Power optimization with performance assurance for multi-tier applications in virtualized data centers, Parallel Processing Workshops (ICPPW), 2010 39th International Conference, Sep. 2010, pp. 512-519.

A. Kansal, J. Liu, A. Singh, R. Nathuji, and T. Abdelzaher, Semanticless coordination of power management and application performance, SIGOPS Oper. Syst. Rev., vol. 44, pp. 66-70, Mar. 2010. [Online]. Available: http://doi.acm.org/10.1145/1740390.1740406.

A. Kansal, F. Zhao, J. Liu, N. Kothari, and A. A. Bhattacharya, Virtual machine power metering and provisioning, Proceedings of the 1st ACM symposium on Cloud computing, ser. SoCC '10. New York, NY, USA: ACM, 2010, pp. 39-50. [Online]. Available: http://doi.acm.org/10.1145/1807128.1807136.

R. Rojas-Cessa, S. Pessima, and T. Tian, Experimental evaluation of energy savings of virtual machines in the implementation of cloud computing, IEEE Wireless and Optical Communications Conference, Apr. 2012, pp. 1-5.

* cited by examiner

| Scenario | No. of levels | Levels | Prob. of per level | Supplied energy/Requested energy (%) | Energy discrepancy (%) | Satisfied requests (%) |
|---|---|---|---|---|---|---|
| 1 | 1 | 3 | 1 | 98.90 | 1.10 | 98.92 |
| 2 | 2 | 3, 6 | 0.7, 0.3 | 98.61 | 1.39 | 98.66 |
| 3 | 2 | 3, 6 | 0.5, 0.5 | 98.65 | 1.35 | 98.69 |
| 4 | 4 | 3, 6, 9, 12 | 0.25, 0.25, 0.25, 0.25 | 98.52 | 1.48 | 98.52 |
| 5 | 4 | 3, 6, 9, 12 | 0.1, 0.2, 0.3, 0.4 | 98.66 | 1.34 | 98.69 |
| 6 | 4 | 3, 6, 9, 12 | 0.4, 0.3, 0.2, 0.1 | 98.42 | 1.58 | 98.47 |
| 7 | 4 | 1, 2, 4, 8 | 0.25, 0.25, 0.25, 0.25 | 98.17 | 1.83 | 98.19 |
| 8 | 4 | 1, 2, 4, 8 | 0.1, 0.2, 0.3, 0.4 | 98.37 | 1.63 | 98.41 |
| 9 | 4 | 1, 2, 4, 8 | 0.4, 0.3, 0.2, 0.1 | 97.97 | 2.03 | 97.99 |
| 10 | 8 | 3, 6, 9, 12, 15, 18, 21, 24 | 0.125, 0.125, 0.125, 0.125 | 98.15 | 1.85 | 98.20 |
| 11 | 8 | 3, 6, 9, 12, 15, 18, 21, 24 | 0.025, 0.05, 0.075, 0.1, 0.125, 0.15, 0.175, 0.3 | 98.43 | 1.57 | 98.47 |
| 12 | 8 | 3, 6, 9, 12, 15, 18, 21, 24 | 0.3, 0.175, 0.15, 0.125, 0.1, 0.075, 0.05, 0.025 | 97.99 | 2.01 | 97.86 |
| 13 | 8 | 1, 2, 4, 8, 16, 32, 64, 128 | 0.125, 0.125, 0.125, 0.125 | 96.46 | 3.54 | 96.43 |
| 14 | 8 | 1, 2, 4, 8, 16, 32, 64, 128 | 0.025, 0.05, 0.075, 0.1, 0.125, 0.15, 0.175, 0.3 | 97.74 | 2.26 | 97.73 |
| 15 | 8 | 1, 2, 4, 8, 16, 32, 64, 128 | 0.3, 0.175, 0.15, 0.125, 0.1, 0.075, 0.05, 0.025 | 93.35 | 6.65 | 93.29 |

FIG. 10

PACKETED ENERGY DELIVERY SYSTEM AND METHODS

FIELD OF THE INVENTION

The present invention relates to the field of power delivery, and in particular to a system and methods for delivering energy in packets in a power grid.

BACKGROUND OF THE INVENTION

Currently, networks for delivering electricity from suppliers to consumers, commonly known as "grids", are always "on" and deliver energy as a shared and uncontrolled system. All customers are connected to the grid and consumption occurs as long as the customers turn on an electrical appliance. Current grids are prone to failures in cases of line overload.

SUMMARY OF THE INVENTION

Currently deployed electrical power distribution systems rely on an old analog circuit approach: a continuous wave at a given frequency and voltage is transmitted through transmission lines from the supplier to the customer(s). Stability of such systems requires monitoring of both supply and demand at any given moment, which may only be achieved on a global level.

In accordance with one embodiment of the presently disclosed subject matter, systems and methods are provided for delivering packetized energy. Each packet is composed of discrete quanta of energy. Each quantum provides for a momentary supply of voltage and current. Each packet may be reserved and targeted for a specific customer through a destination address and employment of appropriate switches along the way. The voltages during the time interval may indicate the addresses of the recipients (which could be customers or specific electrical devices), in a coded manner. Energy packets can be delivered and stored in batteries, or capacitors. Customers may request energy delivery in different manners and utility companies can determine service order.

In current grid systems, energy may be used by whoever tapped into the line. In accordance with the presently disclosed subject matter, a data and power delivery network, referred to herein as a digital grid, is provided to facilitate delivery of power upon request. Energy bits (quanta) serve as a means to deliver energy as well as coding. Energy is thus used only by specific, targeted customers and not non-targeted customers. Voltage pulses of varying time scales are used for coding and current levels help to accurately meet customer's demand. Energy is sent as packets (a combination of energy bits), and specific energy packets are addressed to specific customers permitting accurate monitoring and distribution of electrical energy.

The advantages achieved are operation flexibility, targeted power supply to meet specific customer's demand, high efficiency, and secured transmission. Because the stability of the power grid largely depends on instantaneous monitoring of supply and demand, power failures are minimized when using such approach.

In one example, employing the presently disclosed subject matter in connection with power distribution to specific servers in a datacenter housing hundreds or thousands of servers would result in enormous energy savings. By controlling the power distribution to each server, one may save the unused energy when servers are idle or in standby mode, while energy is allocated to the more active servers. By contrast, currently deployed grids cannot achieve such a result as the existing power grids are circuit-based: the load, dictated by the maximum expected demand, determines the electrical power supplied, which in turn is disseminated indiscriminately across the grid and amongst the multitude of servers.

In accordance with one embodiment, a method of distributing energy in a power grid is provided, the method including assembling energy quanta into at least one energy packet, assigning a destination address to the at least one energy packet, and delivering the at least one energy packet to the destination address in response to a request for energy. The request for energy may include turning on an electrical switch of an electrical device. The address may be a consumer premises or a location of a device. The at least one energy packet may include plural energy quanta, in which each of the quanta has a different frequency. Each energy quantum may be composed of a pulse or a monocycle of predetermined time duration, a predetermined amplitude and a discrete current level. Each energy quantum may include two transmitted frequencies, one which represents 'zero' and the other which represents 'one' in a binary bit format. The energy may be transmitted directly from one grid to another. The energy transmitted may be derived from solar, wind or thermal energy.

In accordance with another embodiment, a system is disclosed for distributing energy in a power grid. The system may include at least one processor operating to perform actions in response to executing computer program instructions, wherein the actions may include assembling energy quanta into at least one energy packet, assigning a destination address to the at least one energy packet, and transmitting the at least one energy packet to the destination address in response to a request for energy. The system may further include distribution segments operable to carry energy packets, and an array of nodes disposed along the distribution segments to receive the energy packets and forward the packets to the assigned destination addresses, wherein the nodes are operable to find a requested energy level and assign power to supply the request, find routing information regarding where to forward energy, and attach destination information and information about supplied energy.

At least one of the nodes of the system may, in some embodiments, include a grid router operable to provide a power path, through which energy packets are delivered to destination addresses, and a data path, along which information is transmitted to monitor customer demand and supply and to configure the power path of power switches.

At least one of the nodes of the system may, in some embodiments, include a power switch comprising at least one input and at least one output operable to receive and transmit data and energy packets, respectively, and operable to separate data and energy packets for configuration, and join the data and energy packets at an output side of the switch.

At least one of the nodes of the system may, in some embodiments, include a power access point (PAP) operable to receive requests for energy.

In a further embodiment, a method is disclosed for processing a request for energy, the method including assigning an address to a customer premises, storing the address at a first node of an electric power grid, receiving at the first node a request for energy, associating the request for energy with the address, transmitting the request to a second node, aggregating at the second node the request for energy with a first group of further requests for energy, forwarding the aggregated energy requests to a power provider, evaluating at least one energy source from which to route energy to the customer premises, obtaining a link state from energy sources that are able to fulfill the request, and securing a path for energy to reach the address. The link state may be delay, availability, and/or pricing. The step of obtaining the link state may be combined with the step of sending a power request to a node that holds the customer address.

The method may include selecting a source to fulfill the request for energy, sending a grant to the customer, and sending energy to the customer. The method may include determining whether an acknowledgment receipt is received from a customer, and determining whether energy delivery should continue or terminate. In still a further embodiment, disclosed is a non-transitory, computer readable storage medium containing a computer program, which when executed by a computer processor causes the computer processor to perform actions, the actions including assembling energy quanta into at least one energy packet, assigning a destination address to the at least one energy packet, and transmitting the at least one energy packet to the destination address in response to a request for energy. The request for energy may include turning on an electrical switch of an electrical device. The address may be a consumer premises or a location of a device. The at least one energy packet may include plural energy quanta, each of the quanta including a different frequency. The each energy quantum may include a pulse or a monocycle of predetermined time duration, a predetermined amplitude and a discrete current level. Each energy quantum may include two transmitted frequencies, one which represents 'zero' and the other which represents 'one' in a binary bit format.

In yet a further embodiment, a method of offsetting power fluctuation in power delivery to a particular energy user is disclosed which includes delivering energy to and storing energy in at least one energy storage device. The energy storage device may be a supercapacitor, battery, or a combination thereof. The energy storage device may be distributed large energy storage which can be termed "cloud" storage.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

FIG. 9($b$) is a graphical depiction of achievable efficiency by the digital grid in an exemplary embodiment of the present invention; and FIG. 10 is tabular depiction of the ratio of supplied energy over a requested energy of 1000 days and the amount of provided energy for 15 scenarios in accordance with one or more aspects of the present invention.

DETAILED DESCRIPTION OF THE INVENTION

Figure 1:
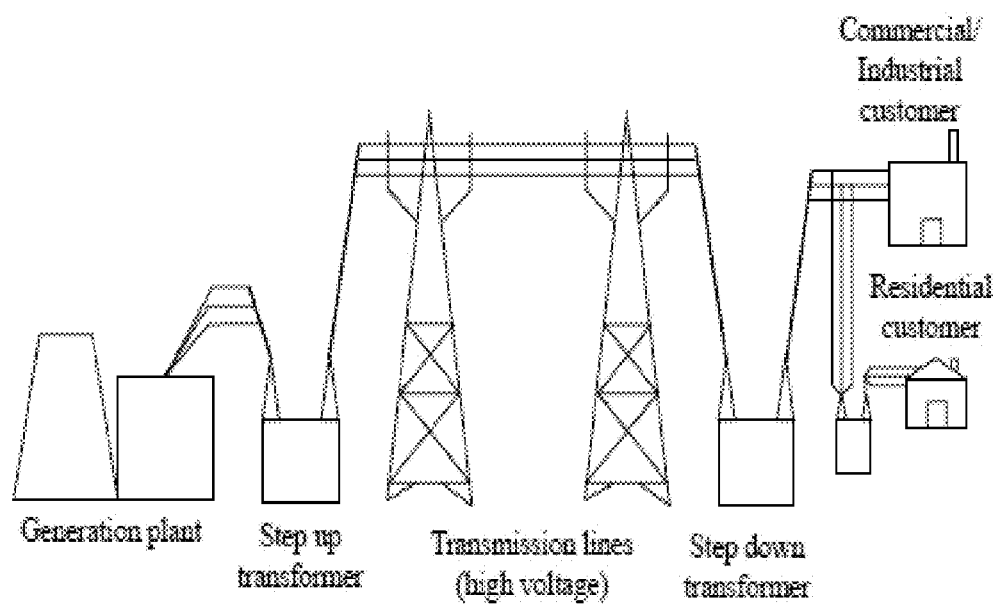
FIG. 1 is a schematic representation of components of the currently deployed electrical grid.

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

A finely tuned power grid is aimed at minimizing the difference between supply and demand without compromising grid stability. For practical reasons, any unused energy should be dissipated, or damage either the energy source or the transmission lines. As evident by everyday experience, presently deployed analog systems are fairly robust; yet, in some respect lagging behind consumers' demand. The actual amount of energy produced at any given time may be only monitored on a large scale basis. The underlying assumption of presently used systems is that local consumption fluctuations (local power surges) are rapidly averaged out given that the number and variety of consumers is very large. Guidelines for energy production are past and anticipated consumption rates. The forecast for demand includes a careful data analysis and predictive models of consumption levels during each time of the day and each day of the year and factored for extenuating circumstances developed. In order to maintain system stability, power providers keep safety margins in a form of overproduction. S. Pahwa, A. Hodges, C. Scoglio, and S. Wood. Topological analysis of the power grid and mitigation strategies against cascading failures; In Systems Conference, 2010 4th Annual IEEE, pages 272-276, April 2010. Such numbers vary but are on the order of 15 percent of the total power consumed. P. N. N. Laboratory. Load shape, 2007. The flexibility of the energy provider to meet local and temporal demand is limited by the number, size, and distribution of generators used and the ease of engaging or disengaging these with the grid. In principle and as implemented today, the over-produced energy may be re-routed to other distribution grids, which face production shortage. In order to meet such challenges in real time, automated cooperation between grids and sometimes between competing commercial entities is required. Energy overproduction is countered by transmission line dissipation, transfer of energy to energy-storage elements and conversion to other forms of energy.

The monitoring issue of present power grids may be resolved by deployment of parallel (auxiliary) sensing networks. However, the basic approach to power distribution would not change, i.e., the power in the grid would be always available and "on" to meet dynamically changing demand.

Accordingly, the presently disclosed systems and methods provide packetized energy distribution and delivery. Energy is distributed through energy quanta (energy bits). Energy quanta are assembled into packets that are addressed to a particular consumer. In accordance with an embodiment, when turning the electrical switch of an electrical device on, a request is made to the energy provider for a precise energy demand. A hand-shake protocol is established between the consumer and supplier, and packets of energy are delivered to the consumer (and perhaps to a particular device such as an appliance). Energy is routed and re-routed by grid switches along the way. The system is monitored at any given time and local surges are mitigated by local energy storage such as batteries and/or super-capacitors acting as energy memory. The use of super-capacitors is discussed in W. Bingbing, Y. Zhongdong, and X. Xiangning, Super-capacitors energy storage system applied in the microgrid, Industrial Electronics and Applications (ICIEA), 2010 the 5th IEEE Conference, pages 1002-1005, June 2010.

In the digital grid disclosed herein, only the targeted customer may use the directed energy. Therefore, systems and methods for delivering packetized energy may include means to ascertain delivery of energy to non-addressed nodes.

The energy packets, initiated by consumer demand, propagate through the grid, re-shaped, and amplified as necessary through the use of an array of power switches and amplifiers. The quantum of energy may be realized by several methods: (1) each energy quantum may consist of a single frequency, for example, in the range of 60-1200 Hz at a given voltage, such as 110 V but at discrete levels of current. A packet may consist of many such energy quanta, each at a different frequency. As an example, a packet may be of the frequencies 60, 70, 120 Hz but not of others. (2) Each energy quantum is composed of a pulse, or a mono-cycle (both positive and negative voltage values and built of many frequencies) of a basic time duration, a given voltage amplitude but varying by discrete current levels. A packet of energy is, therefore made of a sequence of such energy quanta, similarly to an information code.

Power Grid

In general, there are several factors that determine the efficiency of a grid.

Customer Energy Expenditure.

Presently, recording and accounting of customer power consumption is based on cumulative data of energy used, generally in watt-hour units, through electricity meters. The metered values are collected periodically by the energy provider companies on a typical monthly basis. In contrast, in the disclosed systems and methods, energy consumption is instantaneously monitored.

Forecasted Energy Demand.

Currently, energy providers estimate the expected power requirements on the basis of past and anticipated data. The provider reacts to "as developed" situations. In contrast, for the presently disclosed subject matter, while the data collected is valuable, it is made available instantaneously. Furthermore, provisions are made to meet instantaneous requests.

Ability to Re-Route Surplus Energy to Other Grids.

An automated protocol is required for an efficient and instantaneous response to local and temporal energy surges. This is more critical as the grid is shared by several providers and conflict of interest may be ensued. The presently disclosed systems and methods resolve these issues.

Conversion Efficiency.

Conversion of voltage, from alternating current (AC) to direct current (DC) and back to AC at various points of the grid is part of the system operation and results in energy loss. Presently, the conversion is mainly dictated by the efficiency of the physical layer. The result is reflected in the need for overhead of energy produced. In contrast, in accordance with the presently disclosed subject matter, the conversion scheme(s) from the analog energy producing circuits to the digital network may occur at any point in the network, provided that it satisfies overall loss minimization. Moreover, the ability of an appliance to effectively use the power supplied is not just a matter of abundance of energy available; rather, if the energy source becomes more stable and predictable, optimization of the appliance operation itself may be achieved. Take for example the operation of a washing machine: while the power is ON all the time, the machine undergoes several cycles in which the motor is sometimes idle and is vigorously operating during others. If energy is re-directed during the former stages and supplied during the latter stages, then the appliance operation becomes more efficient. This extra quality may be referred to as processing gain.

Energy Storage.

Energy storage is a means to minimize energy waste. In cases where a power production level is given and cannot be further reduced (e.g., in the case of a nuclear generator), storing energy may be a good solution. Yet, electrical energy storage is an inefficient process. In the case of an elaborate power grid, it may require major endeavor. For example, storage of solar energy in melted salt towers is a viable possibility but cannot be implemented for a grid consisting of the entirety of Manhattan Island. Hydro or thermal storage modes present interesting solutions, however on relatively small scales. Yet, if instead, the relatively small electrical power consumed by single appliance is momentarily stored by local energy storage, or even large capacitors, the overall effect is a giant storage media. Such storage media minimizes the overall power dissipation, and increases the processing gain of the individual appliance.

Loss.

Electrical energy that is not used, not re-routed, and not stored is ultimately dissipated and is considered lost. In the presently disclosed system, which may be referred to as a digital grid, such loss is very well accounted for because the quality of service is monitored at the consumer level.

Security.

Two levels of security may be defined: secured service and usage information. In current grid systems, electrical power is made available to the customer and consumption is metered; power usage is only known by its cumulative value. In contrast, in accordance with the presently disclosed subject matter, the provider monitors the actual consumption of a particular consumer instantaneously, thus minimizing abuse for (or by) a particular address. Specifically, a handshake protocol guarantees a provider/customer temporal relationship. Presently, and from the consumer point of view the only way the consumer is made aware of lack of service is when the outlet cannot provide for all appliances' needs. While the presently disclosed digital grid solves such problems through a handshake protocol, the same protocol makes the habits of the customer public something that some customers may decline to disclose.

Model of Currently Deployed Energy Grid

Energy is generated by generation plants (of diverse energy sources) and is distributed continuously through transmission lines (the power grid). Energy is split among different transmission lines through the use of transformers. Energy is used by customers at different times and rates. All energy not used, not returned to the source and not stored has to be dissipated (wasted). For simplicity, the distribution grid may be divided into three segments:

Electrical Energy Generation.

Different electrical energy generators, mostly comprising hydro, coal, and nuclear generators, produce most energy distributed among consumers (the U.S. market can be considered as a reference model, but without limitation to models from other countries). Generators usually produce massive amount of energy with output set to high DC voltage.

Electrical Energy Transmission.

Electrical Energy is carried through long distances to distribution points, closer to the final point of consumption. It is usually transmitted using very large DC voltages to minimize energy loss and phase synchronization between the various grids. There is a voltage step-up process to connect the transmission lines to the generating plant and a step-down stage, if needed, at the distribution points. The distribution points, usually referred to as wholesale customers, make the final sale to residential, commercial, and industrial customers.

Electrical Energy Distribution.

The voltage is stepped down and distributed to smaller loops. In the regional segment, if the energy is expected to be re-routed to another distribution grid, the electrical energy may remain as high DC voltage. In the local segment the energy may be converted to AC voltage delivered to the individual customers.

Figure 2:
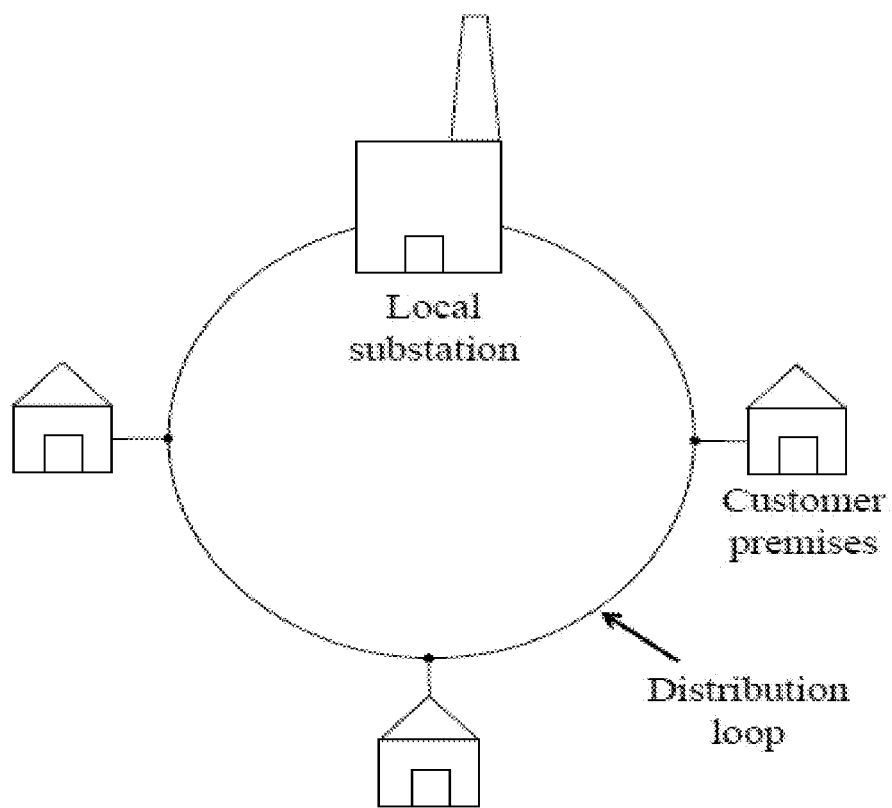
FIG. 2 is a schematic representation of an energy loop in a distribution local segment of the currently deployed grid.

With reference to FIG. 1 a summary of the components of the currently deployed electrical grid is depicted. As mentioned, the grid is "on" all the time. The consumption is only limited by the production capacity and set by the provider. These limits allow for safety margin in order to meet fluctuations in demand in addition to accidental power surges. The data on the consumer use is retroactively collected. FIG. 2 depicts an energy loop in a distribution local segment of the currently deployed grid.

Packetized Energy System

The digital electrical grid in accordance with the present disclosure is based on the principle that energy is carried in discrete units, or energy quanta. Each quantum unit of power (basically VIt with $t_s$ as the time slot duration) is organized in packets of same or varying durations. The energy packet is sent together with a destination address, and therefore designated and destined to a specific customer. The transmission of a quantum may be considered as an energy (voltage and current) pulse if the time duration is very short. The amount of energy per time slot may be scaled up in two dimensions: 1) by using several time slots together to form a train of packets of some length, and 2) by increasing the amount of energy transmitted within a time slot through an increase of current.

Currently available appliances are designed to function in CW mode (an AC voltage and AC current are provided as long as the switch of the appliance is turned ON). In order to smooth the operation of such appliances in the digital grid, one would use rectifiers and energy storage as needed.

Figure 3:
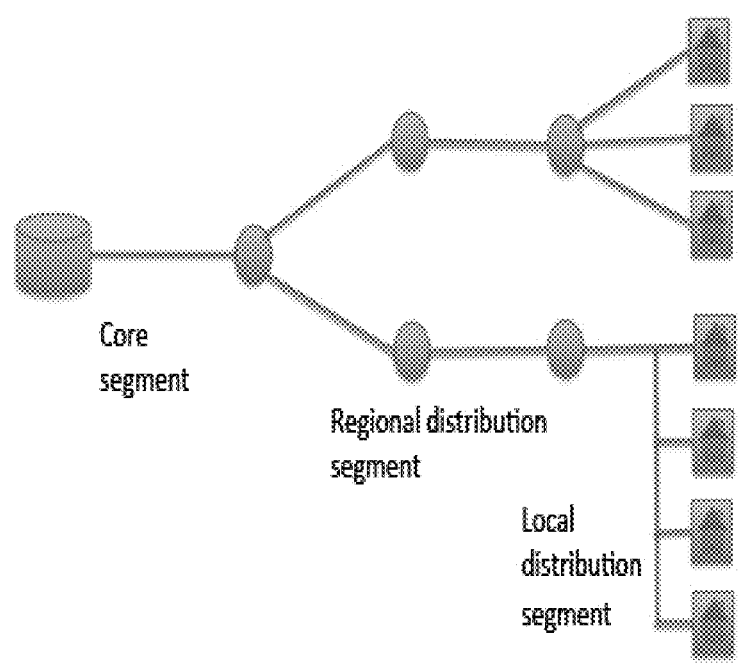
FIG. 3 is schematic representation of a digital grid electrical distribution network with stage segments in accordance with one or more aspects of the present invention.

For illustrative purposes, the transmission and distribution parts of the digital grid are divided into the three segments: core (or long-haul), regional, and local distribution segments. With reference to FIG. 3, the segment connected at the generation plant (or substation) and the distribution points makes up the core segment. A regional distribution segment is used to transmit large amounts of energy (as do high-voltage lines in the current grid) between the distribution points connected to customer premises. Customers are connected to the local distribution segment. The energy then flows from the generation plant, through the different segments, until it reaches the customers.

As in the currently deployed grid, the generation plants of the disclosed digital grid are assumed to have a very slow time response to the second-by-second demand fluctuations. Therefore, the actual demand will be shown only at the power distribution points (namely, in real-time) in contrast to the presently deployed grids in which the demand is forecasted. Such an arrangement requires a new switching methodology, whereby a gate-connect connects the constantly produced energy to the digitized customers loops. The destination information for the energy quanta is aggregated and de-aggregated in various parts of the digital grid. In one embodiment, control over the various nodes is effected by means of an auxiliary network (data network) which carries the requests from the nodes and ascertains the arrival or the energy packet to its destination.

In the digital grid, a data network used for partial control of the transmission of energy is integrated into the network for transmission of energy. The part of the grid that carries energy is referred to herein as a power network. The part of the grid that carries information is referred to herein as the data network. The functions of each segment of the digital grid are summarized as follows:

Core Segment.

The core, or long-haul, segment carries information and power between the power source (for example, a generation plant or a substation) and the regional segments, and uses the addresses of the different regional and local segments for each energy transmission. The regional distribution segments also carry information toward the source indicating the aggregated amount of requested energy by the enclosed local segments. The regional distribution points aggregate the demanded amount of energy and issues a request to the generating source. The core segment communicates among nodes connected on the core segment. These nodes aggregate energy requests from regional segments and supply information from nodes closer to the generation plants.

Regional Segment.

The transmission of data between regional and local segments is similar to that of the core segments. Similar to the regional point, the local point aggregates the demanded amount energy and issues a request to the regional points of energy. The demanded amount of energy is equivalent to that requested by customers. In the opposite direction, the regional points address the energy quanta sent to the local distribution points with the local point address. Similarly to the core segment, the regional segment nodes aggregate request information from the local segments. In the opposite direction, the regional segment nodes determine the addresses and information for the supply of energy at the local segments.

Local Segment.

The local distribution points send the packetized energy addresses to particular customers. Customers send requests for energy to their local distribution point, where each request may include the requested amount and the customer's address. The local distribution points receive the aggregated energy from the regional distribution points and split it into addressed packets, where each packet carries the address of the receiving customer. Only the addressed customers are able to retrieve (receive) the coded energy packet. To facilitate this, a protocol that requests receipt-acknowledgement is combined with access equipment which may be positioned at the distribution network. Customers are connected to a distribution loop via a power access point device described with greater detail herein below.

Figure 4A:
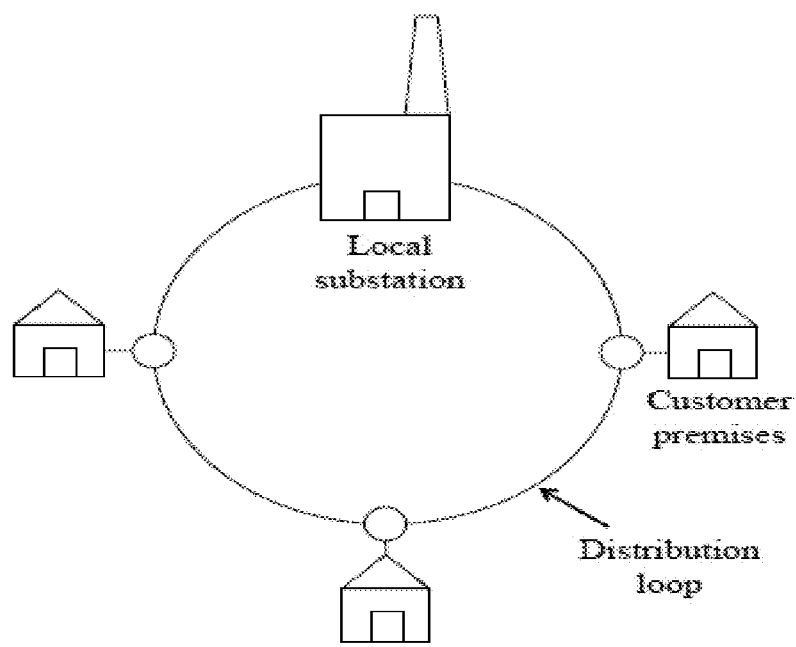
FIG. 4A is a schematic representation of an example of a digitized local segment with access points according to one or more aspects of the present invention.
Figure 4B:
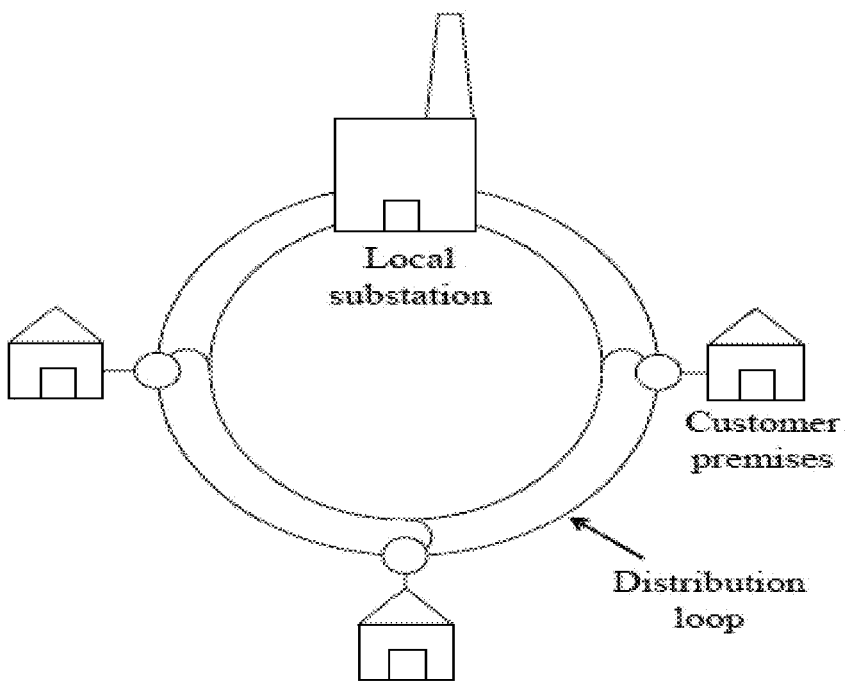
FIG. 4B is a schematic representation of an example of a digitized local segment with access points according to one or more aspects of the present invention.

With reference to FIGS. 4A and 4B, energy quanta targets customers via a shared distribution loop (or broadcast media) wherein the large number of subscribed customers who are connected through the same local loop may receive energy at the same time (but not necessarily the same amount); or a point-to-point distribution loop. In accordance with FIG. 4B, customers may be connected in a point-to-point connection, via double transmission lines. The internal loop can be accessed by each customer independently through a power access point. However, such an arrangement incurs additional infrastructure costs.

Nodes for the Digital Grid

A shared distribution loop is one in which energy is targeted to specific customers by appending the customers' grid address to the energy packet(s). Nodes of the digital grid, or grid equipment, forward energy packets to the end-customer after determining the destined address, which is provided by the local distribution substations.

Nodes may include at least one server coupled to one or more computers or servers over a data network. The server and coupled computers are operable to carry out computing activity (e.g., the execution of suitable software code) in connection with implementing the functions and actions of the systems and methods disclosed and described herein.

By way of example, the server and/or the coupled computers may be implemented using know hardware, firmware, and/or software, as well as specialized software for carrying out specific functions and actions desirable for implementing embodiments of the invention. For example, the server and/or the computers may include a computer, which includes a data processing unit (or processor) and a memory operatively coupled by way of a data and/or instruction bus. The processor may be implemented utilizing any of the known hardware, such as a digital microprocessor, a computer (such as a portable, a stationary and/or a distributed computing system), or any of the other known and/or hereinafter developed data processing units. The memory may be implemented by way of separate hardware or may be disposed within the data processing unit and any of the known hardware and/or software for implementing the memory function may be employed.

Data are preferably input to, and output from, the data processing unit by way of an input/output device (or I/O interface). Operators of the system may desire to input software programs and/or data into the computer by way of an external memory that is coupled to the I/O interface by way of a suitable link (such as a cable, wireless link, etc.) The external memory may be implemented via a flash-drive, disc, remotely located memory device, etc.

The server and/or the coupled computers may also include an interface device, which is operatively coupled to the I/O interface of the computer via a suitable link, such as a cable, wireless link, etc. The interface device may include at least one display, as well as an input device, such as a keyboard, mouse, voice recognition system, etc. The operators of the system, such as an IT professional (on the server end), may utilize the interface device to provide information to the computer in connection with entering appropriate data and/or programs into the system.

The computer manipulates data via suitable software code in accordance with various embodiments of the invention and may display results on the display for consideration by the various operators (IT professionals, users, etc.). In accordance with well-known techniques, the results may also be stored within the memory of the computer output and saved on the external memory device, and/or provided in any of a number of other ways.

Irrespective of how the system is implemented and/or partitioned, it preferably carries out one or more methods as disclosed herein.

Figure 5:
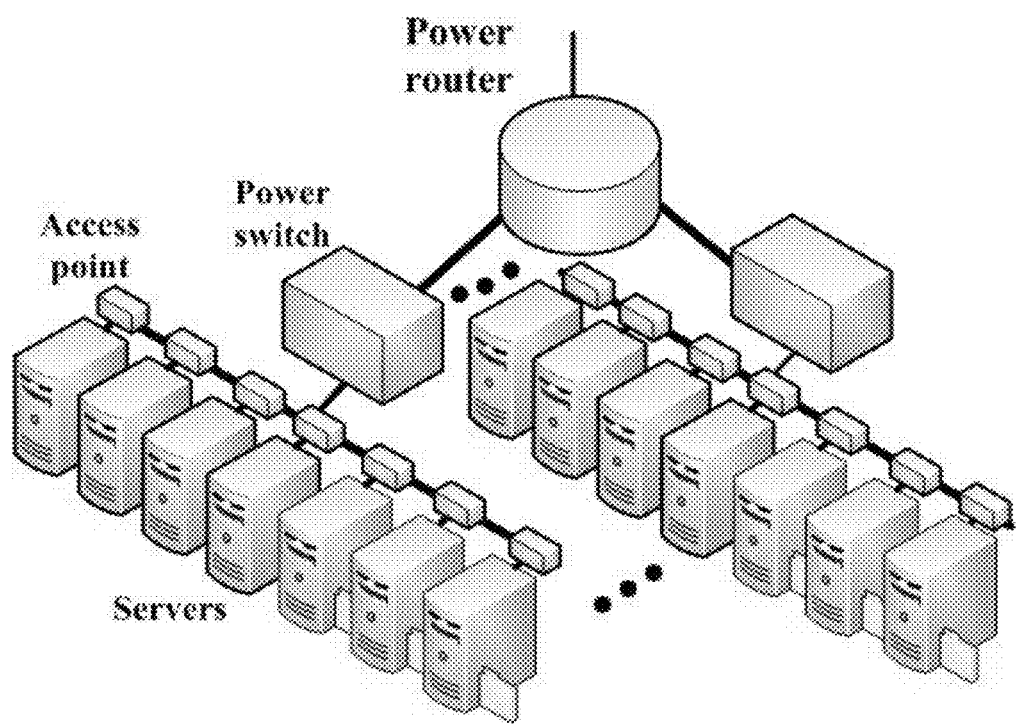
FIG. 5 is schematic representation of components of the digital grid according to one or more aspects of the present invention.

In accordance with one embodiment, the array of nodes along the distribution segments receive the energy packets, decode the addresses and forward the packets to the proper destinations. Now referring to FIG. 5, components of the digital grid are depicted. This equipment may be coarsely divided into three categories: grid (or power) router, power switch, and power access point, in alignment with the different devices used in a data network.

Figure 5A:
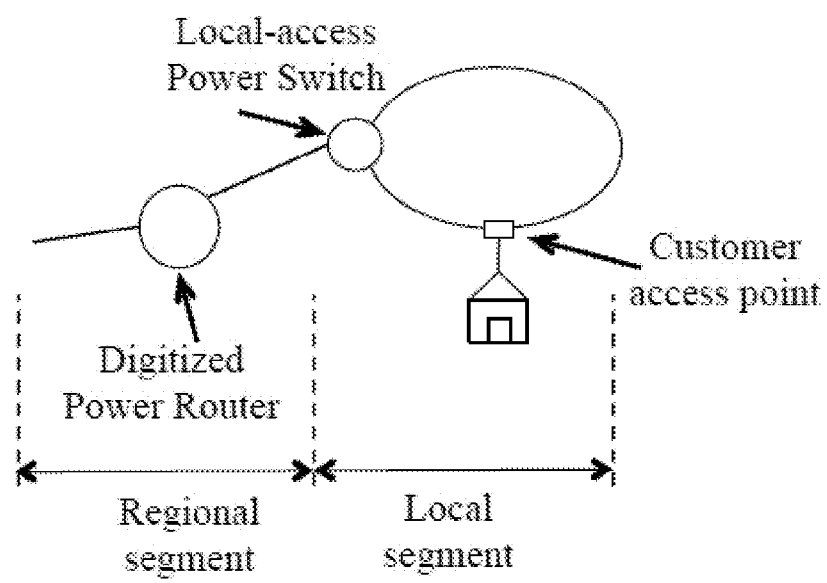
FIG. 5A is a further schematic representation of interconnection components and their placement at various part of the digital grid according to one or more aspects of the present invention.

Now referring to FIG. 5A, the digital grid may include local and regional segments including one or more digitized power routers and local access power switches located in various parts of the digital power grid.

The equipment of the digital grid represents a fusion of power electronics and computer networks, wherein power electronics are used to transmit energy packets to destined customers (through the local distribution grid). The power path of the switches enables routing a constant level of voltage from inputs to the outputs but at different currents. The levels of current are preferably discrete.

Unlike the situation with the presently deployed grid in which power is always ready to be provided, the protocol for the digital grid contemplates some delays in supplying the energy requested by customers. A delay may occur when decoding the address, or deciding on the switching port before energy is transmitted. The delay is small if this happens before the determination of the output port. Switching capacity must be considered to avoid delays, or loss of energy packets may occur. Overbooked switches may require efficient energy storage; otherwise, a routing scheme with a guaranteed clear path should be secured. Minimal delay may also arise as a result of processing of power requests.

The data path of the nodes in the digital grid a) finds the requested energy levels as issued by customers (or local distribution points) and assigns the incoming power to supply those request, b) finds routing information about where to forward the energy, and c) attaches destination information and information about the supplied energy for secure and guaranteed delivery. Because energy quanta (i.e., each quantum) is the same for each destination (in terms of a single unit), the switching function does not need to differentiate the incoming energy but the outgoing one, on a destination-customer basis.

Grid Routers

Grid routers, also referred to herein as power routers, perform routing between energy sources and customers. In accordance with one embodiment, grid routers are principally connected in the core and regional segments. In addition to participating in carrying energy from the generation plants towards the customers, grid routers also interconnect segments from local loops under different administrations, with the purpose to route energy to alternative local segments or from different generation plants.

Figure 6:
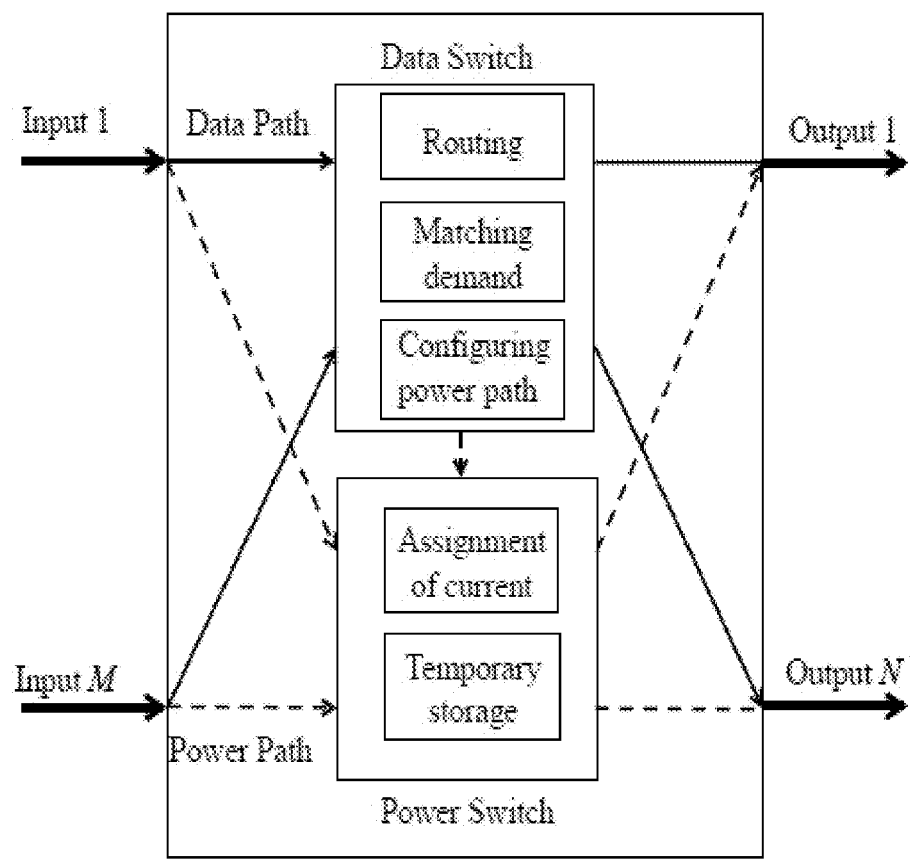
FIG. 6 is a schematic representation of grid power router architecture in accordance with one or more aspects of the present invention.

Now referring to FIG. 6, an embodiment of grid router architecture is disclosed. Switch capacity and size depends on its location in the digital grid. Some switches may have an asymmetrical number of inputs M and outputs N, M<N, or a symmetrical one, M=N. Asymmetrical switches are typically employed in the interface of core and regional segments, while symmetrical switches are typically employed in local distribution segments.

Grid routers preferably are constructed and operable to enable a power path, through which power is delivered to customers; and a data path, along which information is transmitted to monitor customer demand and supply and to configure the power path of the switches. The inputs and outputs of a grid switch receive data and energy packets, which are separated in the switch for configuration, and these two channels are put joined at the egress side of the switch. The inputs and outputs may use a shared or dedicated transmission lines. A shared line means that the high voltage to transmit energy carries the data information embedded in it. Dedicated lines mean that the energy and the data lines are separated (e.g., a data line could use optical fiber).

Power Switch

A power switch is used to interface local and regional segments. A power switch works similar to a grid router, with data and power paths, however, the routing functions in a power switch may be limited as it is principally operable as the access node to local loops. The power switch aggregates energy requests from local segments and forwards them to grid routers. As energy packets flow into the power switch, the energy is forwarded to the local segments.

With reference to FIG. 5A, in one embodiment a possible location of a power switch is shown. Power switches may include a switching control and a power distributor. These switches are sometimes referred to as intelligent power switches because of their application in a smart grid. See, Lu, et al., Smartgridlab: A laboratory-based smart grid testbed; Smart Grid Communications (SmartGridComm), 2010 First IEEE International Conference, pp. 143-148, October 2010; Takuno, et al., In-home power distribution systems by circuit switching and power packet dispatching; Smart Grid Communications (SmartGridComm), 2010 First IEEE International Conference, pp. 427-430, October 2010. However, as the number of customers increases, so does the complexity of switch management functions, including power and data sections of the switch. See, Costabeber, et al., Surround control of distributed energy resources in micro-grids; Sustainable Energy Technologies (ICSET), 2010 IEEE International Conference, pp. 1-6, December 2010; Rojas-Cessa, et al., Coexistence of streaming and packetized data throughout the protocol stack; Sarnoff Symposium, 2009, SARNOFF '09, IEEE, p. 1, April 2009.

Power Access Point

A power access point (PAP) is operable to collect requests for energy. A PAP is used by a customer to access the digital grid. The PAP also communicates with the power switch (at the substation) to request energy and direct the energy to the customer; it acknowledges and monitors the received energy packets. The PAP may also serve as the security device used by the provider as it controls the amount of current drawn by a customer. The PAP is the boundary of the network under the administration of the energy provider. With reference to FIG. 5A, the depicted customer access point is the PAP, i.e., the interconnection between the customer and the local loop.

Addressing Packetized Electrical Energy

As noted above, energy packets are destined to a specific customer. In addition, the large number of subscribed customers who are connected through the same local loop may be able to receive energy at the same time (but not necessarily the same amount of energy). This means that several energy packets are jointly sent. As the time slot of these jointly sent packets is the same, the time slot includes the addresses of multiple destinations. Therefore, the addresses in a given time slot may be transmitted during each time slot. For example, if the power is transmitted at the rate of 60-Hz AC signal, and the addresses of the customers are defined by the Internet Protocol version 4 (IPv4), the time slot is 16.6 ms long, and the transmission time of each address bit is 520 µsec. The addresses may include the addresses of those customers who are scheduled to receive energy during that time slot.

Shared addressing has some similarities to multicast addressing. Yet, it differs in that there are varying numbers of receivers for every time slot. Such a scenario imposes a high coding cost because destinations could be subscribed and un-subscribed continuously. To remedy such situation, in a preferred embodiment only those destination addresses that are to receive energy are decoded. The coding scheme may employ coding techniques known to those of ordinary skill in the art, such as but not limited to Code Division Multiple Access (CDMA).

Figure 7:
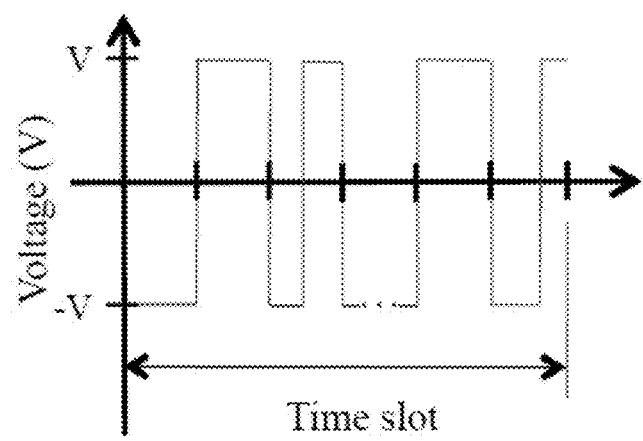
FIG. 7 is a graphic depiction of an example of a coded address sent in a time slot on the voltage of the distributed signal that may be carried out in accordance with one or more aspects of the present invention.

Coded addresses of energy packets may be sent through an auxiliary network (e.g., fast data network running in parallel along the energy transmission lines), or out of band. In such an embodiment some degree of synchronization between the energy supplying network and the auxiliary network is desired. For purposes of the presently disclosed methods and systems, the transmission addresses are embedded in the transmission of energy, in band. To implement such in-band addressing, coded addresses of multicast energy packets at a given time slot are represented by digital voltage, with voltage values between V and −V, where V may range between 0 to 1000 V. FIG. 7 shows an example of voltage used to code the group of destination addresses. The current is preferably also sent in discrete amounts. That is, during a given time slot, the supplied current equals the sum of the required current by each customer sharing the loop.

Management Request of Energy and Supply of Demand

The transmission and distribution grid preferably accommodates requests and controls the energy flow and ascertains power delivery to the nodes (or customers) in a timely fashion, within a reasonable time frame, with a tolerable delay. The maximum delay may depend on the amounts and the type of electrical equipment to be energized. A management protocol is used to determine how much energy is requested and supplied, and includes a mechanism to ensure the delivery of energy to the customer. In summary, the customer premises are assigned an address for representation. Requested and/or supplied energy are associated with the customer address.

In accordance with one embodiment, the following steps describe the request and supply phases.

When a device (e.g., an electrical appliance) is turned ON, the appliance sends a power request (including an identification of the appliance and the amount of energy, and tolerable delay, which can be represented by the energy bit rate) to a node that holds the customer address. The request is transmitted to the local distribution point, which aggregates all customer requests, and forwards the aggregated amount of energy requests to a node at the regional segment. The local aggregated requests are received by the regional node, which aggregates them and sends them to the core node, which forwards these aggregated requests to the generation plant. After receiving a customer request, the provider evaluates a convenient energy source from which to route the energy. In a ring topology, for example, the loop as shown in FIG. 4B, energy packets may arrive to their destination from either side of the loop because the ring is not constantly energized. A link state is obtained from sources that are able to fulfill the request. The link state can represent the delay, availability, and/or pricing. A path is secured to reach the customer. Obtaining the link state can be combined with the step of sending a power request to a node that holds the customer address. If a path is available, the selected source sends a grant to the customer, followed by energy segments.

To secure and verify delivery, the customer may send acknowledgement to the source of the received energy segments. If source stops receiving acknowledgements, the source may trigger an assessment and recovery mechanism. A source stops sending energy segments if a turn off request is received.

Selection of a Supply Source

As noted, the process starts with an end customer's request. The request is processed by the provider who evaluates an optimized path between the end-customer and one or more generation plants. The provider collects consumer requests and available power supply by one or multiple distribution lines (representing the regional segments). The provider then matches supply and demands, preferably in an optimal way. The process can be described as follows:

Determining Demand.

Customer power demand is aggregated. The demands are carried by the data network in the form of energy requests, which indicate the customer ID and the parameters of energy (demanded average current).

Determining Supply Source.

One or multiple supply sources are matched to customer demands, and requests are issued to regional distribution points. The match can be provided based on the different aggregated demands rather than to those of individual customers. A path to the end-customer is determined, and the selected source sends a grant to the customer, followed by energy segments, as described above.

There are several advantages to the digital power grid over the presently deployed analog grid. The presently disclosed digital grid works under a demand-supply protocol, whereby energy provided is requested in advance. This systems and methods disclosed herein provide a metered supply in almost real time. Power in a local loop is then restricted to that requested. If a customer requires a power increase, the request has to be approved, and only then an additional energy packet is provided to the customer (and to the loop). If there is no energy request, the option to shut off the loop may be exercised. In addition, if a customer has a sudden change of impedance such that it attempts to draw more power than that was granted, the local loop may be able to detect it and to take control measures or failure detection capability (for example, through the PAP and power switch).

Figure 8A:
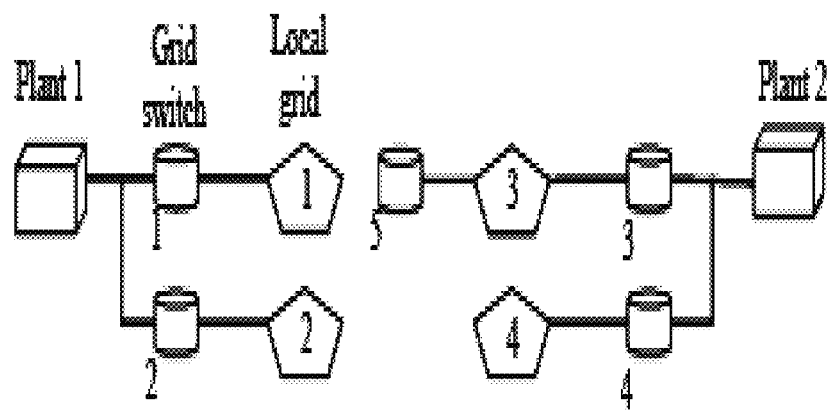
FIG. 8A is schematic representation of a digital power grid without power in accordance with one or more aspects of the present invention.
Figure 8B:
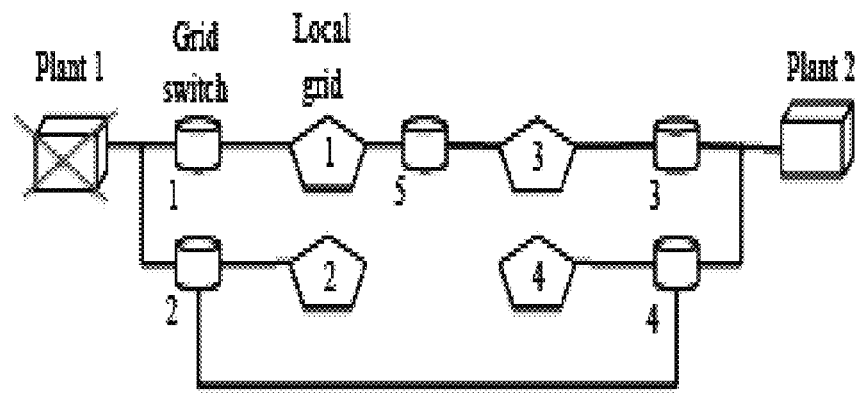
FIG. 8B is schematic representation of a digital power grid under power failure of one power plant in accordance with one or more aspects of the present invention.

Moreover, the digital grid can be especially tolerant to failures, as segments and lines that undergo a failure can be isolated from the rest of the grid, while the unaffected lines can remain supplied by one or several other service providers. In addition, the data network can be used for diagnostics and reconfiguration. As noted hereinabove, failures in generation plants can be circumvented by the selection of alternative plants through the exploration of the re-routing feature of the grid. In the local loop, PAP protects the loop and the customer premises from power surges causes by failures. With reference to FIGS. 8A and 8B, similar protection can be provided in the other segments of the network by the grid routers and power switches. FIG. 8A depicts digital grids without failure, powered by two separate plants (Plant 1 and Plant 2). FIG. 8B depicts the grids in the event of failure of one of the plants, in this example, Plant 1. Power can be rerouted from Plant 2 to overcome the failure of Plant 1.

Moreover, system capacity, traffic control, and grid integrity are all monitored almost instantaneously. The demand may be met in real time even at stressed system conditions. The monitoring at the local segment may be made at the service provider. Efficiency improvements at the appliance level should be realized as well.

Figure 9:
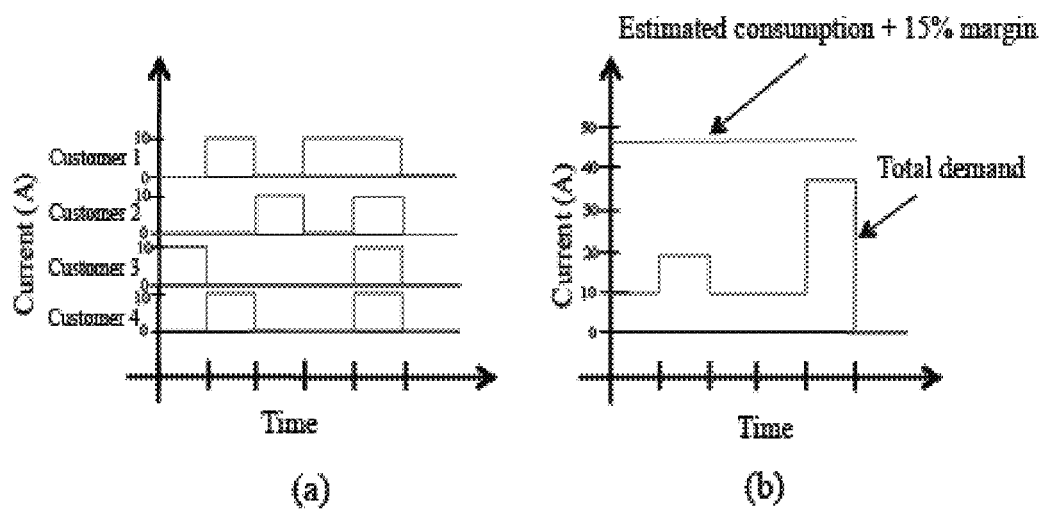
FIG. 9($a$) is a graphical depiction of achievable efficiency by the digital grid in an exemplary embodiment of the present invention.

Additionally, the safety margins required to maintain a viable power system are minimized as a result of better monitoring and control of the power delivered. A more efficient power distribution may be obtained even when the system is stressed by an increased demand. For example, the system may ration the energy requests in favor of continued operation instead of simply crashing. Now referring to FIGS. 9(a) and (b), an example of the achievable efficiency by the digital grid is illustrated. FIGS. 9(a) and (b) show the demanded energy by four customers, individually (FIG. 9(a)), and in total (FIG. 9(b)). As FIG. 9(b) shows, the maximum current is demanded in the time interval. This occurs when all customer demand current at the same time. The current provided by the digital grid would be equal to the curve showing the total current in this figure, while the currently deployed grid may need to forecast a maximum current and may need to provide it during a large period of time (red line). The difference between these curves is the amount of current that can be saved by the digital grid.

In view of recent changes in policy where many competing commercial entities share the same lines, a new way of delivery arbitration is needed. Specifically, two customers sharing the same local segments may use two different energy providers. The presently disclosed systems and methods for a digital grid resolve such competing requests and eliminates much of these conflicts by setting different addresses and destination headers, similarly to the communication networks. Furthermore, re-routing of access power is made easier through the digital grid since it becomes a matter of yet another destination address.

In addition, currently deployed generation plants are slow to respond to local demand changes (hence the safety margins imposed). In accordance with the presently disclosed systems and methods, at the distribution points, currents are distributed as per demand; extra, momentarily unused currents may be diverted to energy storage points. These storage points may have short-term storage capacity (batteries, super capacitors, etc.,) and long-term storage (thermal, hydro, etc.,). Unused energy within a local loop may be routed to a point-of-storage (a fictitious customer) and from there back to the main storage points. Surplus energy from the distribution points or storage points may be re-routed to other (starved) grids. Requests between grids may employ the same protocol as local customers do by using auxiliary networks. Prices may be negotiated on a long term or short term time basis.

Experiments

Performance evaluation of a digital power grid in a datacenter was conducted. Energy distribution in a datacenter was simulated using the digital power grid disclosed herein. The energy demand of a single server was modeled by using a two-state-modulated (ON-OFF) Markov process. One thousand (1000) servers requesting energy at random times and with bursts of different average durations were studied. Because in a digital grid the amount of power delivered to a server can be finely specified, it was considered that the energy demand is also discrete. The discrete amounts of power can have a single or multiple numbers of watt-hours. The Table in FIG. 10 shows the fifteen (15) different scenarios (numerated from 1 to 15) considered in the study. The scenarios differ in the number possible levels of energy and amount of energy per level that a server may request. The digital power grid then attempted to satisfy the levels of energy requested. However, if the digital power grid could not provide a requested energy level (because of exhaustion of the energy capacity) it then attempted to provide a smaller level of energy. For example, in Scenario 2 in the table, the energy levels that could be requested were 3 and 6 units. If a server requested 6 units, but the power grid was not able to provide those, it may provide 3 units if available. This scenario cannot be accommodated by the currently deployed electrical grid infrastructure as energy is not addressable and all servers connected would consume whatever is on the distribution line. Furthermore, the server energy request is modeled by providing a probability that a level is requested for each server. The table then shows the probabilities for each possible energy level in each scenario. Cases were explored when the probabilities for each level request are the same and different. Since it is of interest to minimize the total amount of energy required to energize a complete datacenter, scenarios were considered where the distribution loop has a capacity equal to the average consumption of energy. That is, the focus was on minimizing the additional amount of energy prodded to satisfy sudden energy surges as those are expensive to provide for and most likely occasional. Therefore, the energy capacity was estimated as the average energy request for about 1 year, where a day is divided into three periods of 8 hrs. each. The periods have an average (burst) request of 3, 6, and 9 hrs., and requests can arise in an ON-OFF Markov modulated process in hourly basis.

The table shows the ratio of the supplied energy over the requested energy of 1000 days and the amount of provided energy for all 15 scenarios (the fifth column). The results show that the cases with a small number of levels may average small average energy request while in those with a large number of levels, the average energy request is high. Furthermore, the average energy supplied is very close to that requested. The table also shows the discrepancy between the requested and supplied energy of the considered scenarios. Here, the discrepancy is equal or smaller than 2% for Scenarios 1 to 12, and 7% for Scenario 15. Because the digital power grid not only reduces the energy margin required to satisfy occasional and surging energy demands, but also eliminates this margin it can allocate the available energy selectively. Therefore, it is important to estimate the number of requests that are fully satisfied. The table also shows the percentage of fully satisfied requests. As this figure shows, Scenario 15 received 93% satisfaction, Scenario 13 received 96% satisfaction and the remaining scenarios higher satisfaction, 98% and above.

In all these cases, high-energy demands can be controlled by the digital power grid in accordance with the present disclosure.

There are a multitude of everyday applications which would benefit from the disclosed subject matter. For example, as servers in a datacenter may be assigned different workloads, it is expected that each server may have different energy demands. The systems and methods disclosed herein can be applied to cross-layer optimize computing jobs assignment and energy supply for efficient datacenters.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention. All references cited and listed are incorporated by reference herein in their entireties.

REFERENCES

[1] R. Abe, H. Taoka, and D. McQuilkin. Digital grid: Communicative electrical grids of the future. Smart Grid, IEEE Transactions on, 2(2):399-410, June 2011.
[2] W. Bingbing, Y. Zhongdong, and X. Xiangning. Supercapacitors energy storage system applied in the microgrid. In Industrial Electronics and Applications (ICIEA), 2010 the 5th IEEE Conference, pages 1002-1005, June 2010.
[3] S. Bossart and J. Bean. Metrics and benets analysis and challenges for smart grid field projects. In Energytech, 2011 IEEE, pages 1-5, May 2011.
[4] F. Bouhafs, M. Mackay, and M. Merabti. Links to the future: Communication requirements and challenges in the smart grid. Power and Energy Magazine, IEEE, 10(1): 24-32, Janurary-Feburary 2012.
[5] K. Budka, J. Deshpande, J. Hobby, Y.-J. Kim, V. Kolesnikov, W. Lee, T. Reddington, M. Thottan, C. White, J.-I. Choi, J. Hong, J. Kim, W. Ko, Y.-W. Nam, and S.-Y. Sohn. Geri-Bell Labs smart grid research focus: Economic modeling, networking, and security amp; privacy. Smart Grid Communications (SmartGridComm), 2010 First IEEE International Conference, pages 208-213, October 2010.
[6] A. Costabeber, P. Tenti, and P. Mattavelli. Surround control of distributed energy resources in micro-grids. In Sustainable Energy Technologies (ICSET), 2010 IEEE International Conference, pages 1-6, December 2010.
[7] Z. Fan, P. Kulkarni, S. Gormus, C. Efthymiou, G. Kalogridis, M. Sooriyabandara, Z. Zhu, S. Lambotharan, and W. Chin. Smart grid communications: Overview of research challenges, solutions, and standardization activities. Communications Surveys Tutorials, IEEE, PP(99): 1-18, 2012.
[8] S. Galli, A. Scaglione, and Z. Wang. For the grid and through the grid: The role of power line communications in the smart grid. Proceedings of the IEEE, 99(6):998-1027, June 2011.
[9] R. Gono, S. Rusek, and M. Kratky. Reliability analysis of distribution networks. In Electrical Power Quality and Utilisation, 2007. EPQU 2007. $9^{th}$ International Conference, pages 1-5, October 2007.

[10] H. He. Toward a smart grid: Integration of computational intelligence into power grid. In Neural Networks (IJCNN), The 2010 International Joint Conference, pages 1-6, July 2010.

[11] P. N. N. Laboratory. Load shape, 2007.

[12] F. Lei, G. Ruifeng, Z. Wanrong, and Y. Xiaoping. Type and characteristic analysis of fault current limiter. In Electric Power Equipment-Switching Technology (ICEPE-ST), 2011 1st International Conference on, pages 356-361, October 2011.

[13] W.-H. Liu, K. Liu, and D. Pearson. Consumer-centric smart grid Innovative Smart Grid Technologies (ISGT), 2011 IEEE PES, pages 1-6, January 2011.

[14] G. Lu, D. De, and W.-Z. Song. Smartgridlab: A laboratory-based smart grid testbed. Smart Grid Communications (SmartGridComm), 2010 First IEEE International Conference, pages 143-148, October 2010.

[15] S. Pahwa, A. Hodges, C. Scoglio, and S. Wood. Topological analysis of the power grid and mitigation strategies against cascading failures. Systems Conference, 2010 4th Annual IEEE, pages 272-276, April 2010.

[16] R. Rojas-Cessa, Z. Dong, and C.-B. Lin. Coexistence of streaming and packetized data throughout the protocol stack. Sarnoff Symposium, 2009. SARNOFF '09. IEEE, pages 1-5, Apr. 1, 2009.

[17] H. Slootweg. Smart grids—the future or fantasy? Smart Metering-Making It Happen, 2009 IET, pages 1-19, February 2009.

[18] T. Takuno, M. Koyama, and T. Hikihara. In-home power distribution systems by circuit switching and power packet dispatching. Smart Grid Communications (SmartGridComm), 2010 First IEEE International Conference, pages 427-430, October 2010.

[19] W.-Y. Yu, V.-W. Soo, M.-S. Tsai, and Y.-B. Peng. Coordinating a society of switch agents for power distribution service restoration in a smart grid. Intelligent System Application to Power Systems (ISAP), 2011 16th International Conference, pages 1-7, September 2011.

[20] T. Takuno, Y. Kitamori, R. Takahashi, and T. Hikihara, "Ac power routing system in home based on demand and supply utilizing distributed power sources," *Energy*, vol. 4, no. 5, pp. 717-726, June 2011.

[21] M. M. He, E. M. Reutzel, X. Jiang, R. H. Katz, S. R. Sanders, D. E. Culler, and K. Lutz, "An architecture for local energy generation, distribution, and sharing," IEEE Energy2030, November 2008, pp. 1-6.

[22] J. Virden, "Large-scale energy storage opportunities and renewable energy and smart grid," April 2011, Pacific Northwest National Laboratory. [Online]. Available: http://energyenvironment.pnnl.gov/presentations/pdf/

[23] M. Marcu and D. Tudor, "Power consumption measurements of virtual machines," Applied Computational Intelligence and Informatics (SACI), 2011 6th IEEE International Symposium, May 2011, pp. 445-449.

[24] A. Beloglazov and R. Buyya, "Energy efficient resource management in virtualized cloud data centers," in Cluster, Cloud and Grid Computing (CCGrid), 2010 10th IEEE/ACM International Conference, May 2010, pp. 826-831.

[25] J. F. Brady, "Virtualization and cpu wait times in a linux guest environment," J. Comp. Resource Mgmt, vol. 116, 2005.

[26] Y. Wang and X. Wang, "Power optimization with performance assurance for multi-tier applications in virtualized data centers," Parallel Processing Workshops (ICPPW), 2010 39th International Conference, September 2010, pp. 512-519.

[27] A. Kansal, J. Liu, A. Singh, R. Nathuji, and T. Abdelzaher, "Semanticless coordination of power management and application performance," SIGOPS Oper. Syst. Rev., vol. 44, pp. 66-70, March 2010. [Online]. Available: http://doi.acm.org/10.1145/1740390.1740406

[28] A. Kansal, F. Zhao, J. Liu, N. Kothari, and A. A. Bhattacharya, "Virtual machine power metering and provisioning," Proceedings of the 1st ACM symposium on Cloud computing, ser. SoCC '10. New York, N.Y., USA: ACM, 2010, pp. 39-50. [Online]. Available: http://doi.acm.org/10.1145/1807128.1807136

[29] R. Rojas-Cessa, S. Pessima, and T. Tian, "Experimental evaluation of energy savings of virtual machines in the implementation of cloud computing," IEEE Wireless and Optical Communications Conference, April 2012, pp. 1-5.

What is claimed is:

1. A method of distributing energy in a power grid comprising assembling plural energy quanta into at least one energy packet, wherein each energy quantum comprises a predetermined amplitude and a discrete current level, and wherein at least one of the energy quanta comprises at least two different frequencies, assigning a destination address to the at least one energy packet, and delivering the at least one energy packet to the destination address in response to a request for energy.

2. The method according to claim 1 wherein the request for energy comprises turning on an electrical switch of an electrical device.

3. The method according to claim 1 wherein the address is a consumer premises or a location of a device.

4. The method according to claim 1 wherein each energy quantum comprises two transmitted frequencies, one which represents 'zero' and the other which represents 'one' in a binary bit format.

5. The method according to claim 1 wherein each energy quantum comprises a pulse or a monocycle of predetermined time duration.

6. The method according to claim 1 wherein the energy is transmitted directly from one grid to another.

7. The method according to claim 6 wherein the energy transmitted is energy derived from solar, wind or thermal energy.

8. A system for distributing energy in a power grid, including at least one processor operating to perform actions in response to executing computer program instructions, the actions comprising assembling plural energy quanta into at least one energy packet, wherein each energy quantum comprises a predetermined amplitude and a discrete current level, and wherein at least one of the energy quanta comprises at least two different frequencies, assigning a destination address to the at least one energy packet, and transmitting the at least one energy packet to the destination address in response to a request for energy, wherein the system comprises distribution segments operable to carry energy packets and an array of nodes disposed along the distribution segments to receive the energy packets and forward the packets to the assigned destination addresses, wherein the nodes are operable to find a requested energy level and assign power to supply the request, find routing information regarding where to forward energy, and attach destination information and information about supplied energy.

9. The system according to claim 8 wherein at least one of the nodes comprises a grid router operable to provide a power path, through which energy packets are delivered to destination addresses, and a data path, along which information is transmitted to monitor customer demand and supply and to configure the power path of power switches.

10. The system according to claim 8 wherein at least one of the nodes comprises a power switch comprising at least one input and at least one output operable to receive and transmit data and energy packets, respectively, and operable to separate data and energy packets for configuration, and join the data and energy packets at an output side of the switch.

11. The system according to claim 8 wherein at least one of the nodes comprises a power access point (PAP) operable to receive requests for energy.

12. A non-transitory, computer readable storage medium containing a computer program, which when executed by a computer processor causes the computer processor to perform actions, the actions comprising assembling plural energy quanta into at least one energy packet, wherein each energy quantum comprises a predetermined amplitude and a discrete current level, and wherein at least one of the energy quanta comprises at least two different frequencies, assigning a destination address to the at least one energy packet, and transmitting the at least one energy packet to the destination address in response to a request for energy.

13. The method according to claim 12 wherein the request for energy comprises turning on an electrical switch of an electrical device.

14. The method according to claim 12 wherein the address is a consumer premises or a location of a device.

15. The method according to claim 12 wherein each energy quantum comprises a pulse or a monocycle of predetermined time duration.

16. The method according to claim 12 wherein each energy quantum comprises two transmitted frequencies, one which represents 'zero' and the other which represents 'one' in a binary bit format.

* * * * *